United States Patent
Yamaguchi (10) Patent No.: US 7,020,053 B2
(45) Date of Patent: Mar. 28, 2006

(54) OPTICAL DISC APPARATUS (75) Inventor: Takahiro Yamaguchi, Daito (JP)

(73) Assignee: Funai Electric Co., Ltd., Daito (JP)

( * ) Notice: Subject to any disclaimer, the term of this patent is extended or adjusted under 35 U.S.C. 154(b) by 417 days.

(21) Appl. No.: 10/382,993

(22) Filed: Mar. 7, 2003

(65) Prior Publication Data
US 2004/0001401 A1    Jan. 1, 2004

(30) Foreign Application Priority Data
Mar. 8, 2002   (JP)  .............................. 2002-062823

(51) Int. Cl.
G11B 7/095  (2006.01)
(52) U.S. Cl. .............................. 369/44.26; 369/44.27; 369/47.39; 369/53.37; 369/44.25
(58) Field of Classification Search ............ 369/44.23, 369/44.27, 44.28, 30.13, 30.15, 30.17, 30.03, 369/47.24, 47.28, 47.48, 53.37, 275.3, 53.28, 369/59.17, 44.25, 44.26, 53.21, 53.24, 53.15, 369/47.39
See application file for complete search history.

(56) References Cited
U.S. PATENT DOCUMENTS

| | | | | |
|---|---|---|---|---|
| 5,515,351 A | * | 5/1996 | Nonaka et al. ........... | 369/44.27 |
| 5,740,152 A | * | 4/1998 | Yokogawa et al. ........ | 369/275.3 |
| 5,793,715 A | * | 8/1998 | Alon et al. ................ | 369/30.13 |
| 6,192,015 B1 | * | 2/2001 | Kim ........................ | 369/47.48 |
| 6,801,488 B1 | * | 10/2004 | Kato et al. ................ | 369/47.28 |
| 6,804,176 B1 | * | 10/2004 | Komazaki ................. | 369/30.03 |
| 6,885,623 B1 | * | 4/2005 | Oishi et al. ............... | 369/53.37 |

FOREIGN PATENT DOCUMENTS
JP    11-053836    2/1999

* cited by examiner

Primary Examiner—William Korzuch
Assistant Examiner—Kim-Kwok Chu
(74) Attorney, Agent, or Firm—Crowell & Moring LLP (57) ABSTRACT In an initial operation of an optical disc apparatus for reading out information data recorded in the innermost data recording area on the optical disc, a main processor judges whether periods between adjoining two pits are normal or not from signals outputted from an optical pickup. When the periods of the pits are normal, a light beam emitted from the optical pickup is on the present data recording track, and the information data is read out from the optical disc. Alternatively, when the periods of the pits are abnormal, the optical pickup is moved inwardly with sensing the periods of the pits and judges whether the periods are normal or not. When the periods of the pits become normal, the light beam is precisely tracked on the present data recording track, and reproduces the information data from the optical disc.

7 Claims, 4 Drawing Sheets

OPTICAL DISC APPARATUS

BACKGROUND OF THE INVENTION

1. Field of the Invention

The present invention relates to an optical disc apparatus for recording and/or reproducing data on an optical disc such as a CD (compact disc) or a DVD (digital versatile disc).

2. Description of the Related Art

In the optical disc apparatus, data are reproduced from the optical disc such as the CD or DVD, and the data are recorded on recordable optical disc such as a CD-R, CD-RW, DVD-R, DVD-RW, or the like by an optical head called "optical pickup". Data recording tracks are formed concentrically or spirally on such the optical disc. The optical pickup is constituted for emitting light beams such as laser beams by a laser diode, for focusing the light beams on the data recording face of the optical disc through an objective lens, for receiving a reflected light reflected from a data recording face of the optical disc and converting variation of intensity of the reflected light to electric signals by a photo-sensor and for outputting the electric signals. The optical pickup is moved in a radial direction of the optical disc.

For reproducing the data from the optical disc or for recording the data on the optical disc, the optical pickup is moved in the radial direction of the optical disc for facing a data recording track on which the data are recorded or to be recorded. The laser diode of the optical pickup emits a light beam and the light beam is focused on the data recording track by the objective lens, while the optical disc is rotated.

For reproducing the data from the optical disc, the objective lens of the optical pickup is moved in a direction perpendicular to the data recording face of the optical disc in a manner so that the concentration point of the focused light beam is just placed on the data recording face of the optical disc. Subsequently, the objective lens of the optical pickup is moved in the radial direction of the optical disc in a manner so that the concentration point of the focused light beam is just placed on the data recording track on the optical disc, while the concentration point of the focused light beam is placed on the data recording face of the optical disc.

Such the focusing and tracking operations of the optical pickup are controlled corresponding to the electric signals outputted from the photo-sensor of the optical pickup. Pits formed on the data recording tracks on the optical disc are sensed from the electric signals outputted from the photo-sensor of the optical pickup, while the light beam is focused and tracked on the data recording track on the optical disc. Thus, the data are read out from the optical disc and will be reproduced.

For recording the data on the optical disc, pits corresponding to the data to be recorded are formed on the data recording tracks by concentrating the light beams pulsatively on the data recording track on the optical disc by the laser diode of the optical pickup.

When the optical disc is read-only use on which data of sounds or video images are recorded, information data for showing the contents or operation program are recorded in the innermost data recording area on the data recording face of the optical disc. When the optical disc is recordable by a user, the information data are sequentially recorded on the data recording tracks in the innermost data recording area from the inside.

When an optical disc is loaded on the optical disc apparatus, the optical disc apparatus executes an initial reading operation for reading out the information data from the innermost data recording area. Subsequently, the optical disc apparatus judges the kinds of the optical disc and the contents of the information data and controls the recording or reproducing operation corresponding to the information data read out from the optical disc in the initial reading operation. In such the initial reading operation, the optical pickup is placed at an initial reading position a little outside from the innermost edge of the data recording area on the optical disc, at the start. The light beam emitted from the laser diode of the optical pickup is focused on a position on the data recording area facing the initial reading position of the optical pickup.

In a conventional optical disc apparatus, which is, for example, shown in publication gazette of Japanese patent application 11-53836, it is judged whether user data are recorded in a data recording area or not when other data are recorded in a data recording area on an optical disc or reproduced from the data recording area on an optical disc so as not to break the user data recorded on the optical disc.

When a recordable optical disc, on which the information data are recorded a little, is loaded on the conventional optical disc apparatus, the initial reading position of the optical pickup is sometimes placed outside from the data recording tracks on which the information data are recorded. In such the case, no pit is formed on the position or track on which the light beam is focused, so that it is impossible to track the light beam on the data recording track. Thus, the information data cannot be read out from the optical disc due to missing the focusing of the light beam. When the focusing of the light beam is missed, the initial reading operation will be retried in several times. The information data recorded in the innermost data recording area, however, cannot be read out by retrying the initial reading operation in many cases. Even when the information data can be read out by retrying the initial reading operation, it wastes a lot of time.

SUMMARY OF THE INVENTION

An object of the present invention is to provide an optical disc apparatus by which information data recorded in the innermost data recording area can quickly and precisely be read out in the initial reading operation, even when the information data are recorded a little in the innermost data recording area on the optical disc.

An optical disc apparatus in accordance with an aspect of the present invention comprises: an optical pickup for emitting a light beam to the optical disc, receiving a reflected light from a data recording face of the optical disc, converting variation of intensity of the reflected light to electric signals and outputting the electric signals; a driving mechanism for moving the optical pickup in a radial direction of the optical disc; a signal processor for generating intensity signals of the reflected light, focusing error signals and tracking error signals corresponding to the signals outputted from the optical pickup, and outputting the signals; a data slice signal generator for generating data slice signals generated by digitalizing the intensity signals of the reflected light outputted from the signal processor; a focusing servo controller for focusing the light beam emitted from the optical pickup on the data recording face of the optical disc corresponding to the focusing error signals outputted from the signal processor; a tracking servo controller for tracking the light beam on a data recording track on the optical disc corresponding to the tracking error signals outputted from the signal processor; and a main processor for controlling an initial reading operation so as to read out information data recorded in the innermost data recording area on the optical disc.

In the initial reading operation, the main processor controls the driving mechanism so as to place the optical pickup at an initial reading position outwardly distant a predetermined distance from the innermost edge of the innermost data recording area on the optical disc, at the start. The main processor senses periods between adjoining two pits formed on the optical disc based on the data slice signals outputted from the data slice signal processor while the light beam emitted from the optical pickup is focused on the data recording face of the optical disc by the focusing servo controller at the initial reading position, and compares the periods between the pits with a standard value memorized in a memory.

When the periods between the pits are equal to or smaller than the standard value, the main processor judges that the information data are recorded on a data recording track facing the initial reading position of the optical pickup, controls the tracking servo controller so as to track the light beam precisely on the data recording track facing the initial reading position, and reproduces the information data based on the data slice signals obtained from the pits sensed on the data recording track.

Alternatively, when the periods between the pits are larger than the standard value, the main processor judges that no information data is recorded on a data recording track facing the initial reading position of the optical pickup, controls the driving mechanism so as to move the optical pickup inwardly from the initial reading position, senses periods between the pits formed on the optical disc based on data slice signals outputted from the data slice signal processor while the optical pickup is moved and the light beam is focused on the data recording face of the optical disc, and compares the periods between the pits with the standard value memorized in a memory.

When the periods of the pits become equal to or smaller than the standard value, the main processor judges that the information data are recorded on the data recording track facing the optical pickup, controls the tracking servo controller so as to track the light beam precisely on the data recording track, and reproduces the information data based on the data slice signals obtained from the pits sensed on the data recording track.

By such the configuration, in the initial reading operation for reading out the information data from the innermost data recording area on the optical disc, it is judged whether the information data are recorded on the data recording track facing the initial reading position of the optical pickup or not, at the start before precisely tracking on the laser beam on the data recording track. When the information data is not recorded on the data recording track facing the initial reading position of the optical disc, it is further judged whether the information data is recorded in the innermost data recording area inward from the initial reading position or not before precisely tracking the laser beam on the data recording track. When the track or area on which the information data are recorded is existed in the data recording area inward from the initial reading position, the light beam is precisely tracked on the data recording track so as to read out the information data. Thus, no tracking operation for precisely tracking the light beam on the data recording track is executed on the data recording track on which no information data is recorded. Since the tracking operation is executed only to the data recording track on which the information data are recorded, the information data can be read out from the innermost data recording area on the optical disc quickly and certainly.

DETAILED DESCRIPTION OF THE EMBODIMENT

Figure 1:
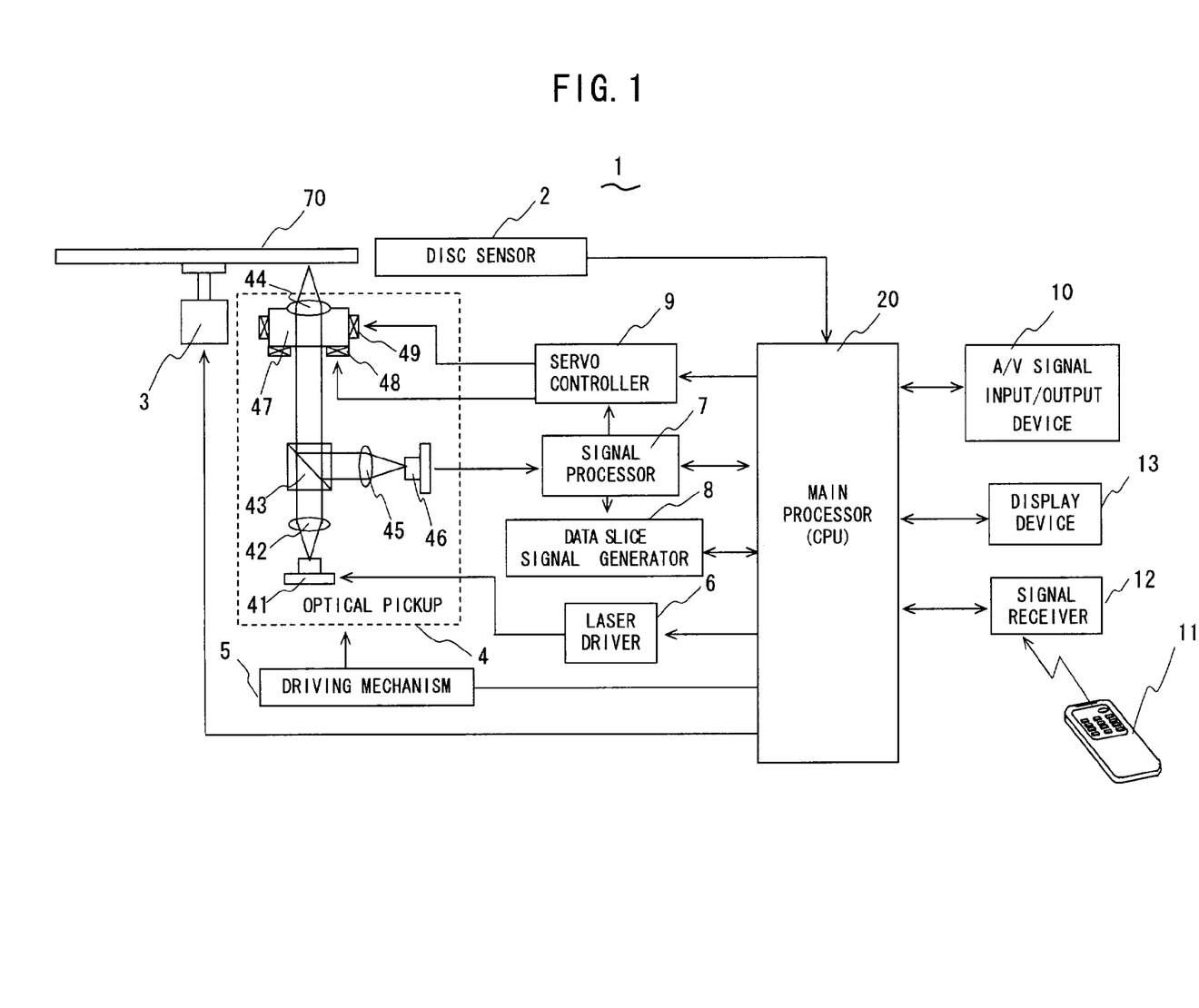
FIG. 1 is a block diagram showing a constitution of an optical disc apparatus in accordance with an embodiment of the present invention.

An embodiment of an optical disc apparatus in accordance with the present invention is described. FIG. 1 is a block diagram showing a configuration of the optical disc apparatus in the embodiment. The optical disc apparatus 1 records and/or reproduces data such as sounds or video images on an optical disc 70 such as a CD or a DVD on which data recording tracks are formed concentrically or spirally.

The optical disc apparatus 1 comprises a disc sensor 2, a spindle motor 3, an optical pickup 4, a driving mechanism 5, a laser driver 6, a signal processor 7, a data slice signal generator 8, and a servo controller 9. The servo controller 9 serves as not only a focusing servo controller but also a tracking servo controller. The optical disc apparatus 10 further comprises an audio/visual (A/V) signal input/output device 10, a remote controller 11, a signal receiver 12, a display device 13 and a main processor 20 constituted by, for example, a ROM for memorizing an operation program, a CPU for executing the operation program, and a RAM temporality for memorizing data to be processed.

The disc sensor 2 senses whether the optical disc 70 is loaded on a tray (not shown) or not and outputs a sensing signal corresponding to the existence or nonexistence of the optical disc 70 to the main processor 20. When the optical disc 70 is loaded on the tray, the optical disc 70 will be chucked on a rotation shaft of the spindle motor 3 so as to be rotated. The rotation of the spindle motor 3 is controlled by the main processor 20.

When data are reproduced from the optical disc 70, the optical pickup 4 emits a light beam on the optical disc 70, receives a reflected light from the optical disc 70, converts the reflected light to electric signals and outputs the electric signals to the main processor 20. When data are recorded on the optical disc 70, the optical pickup 4 emits light beams pulsatively on the optical disc 70 correspondingly to the contents of the data to be recorded. The optical pickup 4 is moved in radial direction of the optical disc 70 by the driving mechanism 5 which is constituted by, for example, a linier motor. The movement of the driving mechanism 5 is controlled by the main processor 20.

The optical disc 4 comprises a laser diode 41 for emitting laser light beams, a collimator lens 42 for expanding the light beams emitted from the laser diode 41, a beam splitter 43 for transmitting and reflecting the light beams corresponding to incident direction of the light beams, and an objective lens 44 for focusing each light beam on the optical disc 70. The light beam focused on the optical disc 70 is reflected by the data recording face of the optical disc 70. The reflected light is received by a photo-sensor 46 through the objective lens 44, the beam splitter 43 and a condenser lens 45.

The emission of the light beam by the laser diode 41 is controlled by the laser driver 6 under the control of the main processor 20. The photo-sensor 46 is constituted by a photodiodes in which a photo-sensing face is divided into a plurality of areas and each area outputs electric signals corresponding to variation of intensity of received light. Output signals from the photo-sensor 46 are inputted to the signal processor 7.

The objective lens 44 is held on a lens holder 47. A focusing coil 48 and a tracking coil 49 are provided in the vicinity of the lens holder 47. The focusing coil 48 minutely moves the objective lens 44 on the lens holder 47 in a direction perpendicular to the data recording face of the optical disc 70 by electromagnetic action with a magnet (not shown). The tracking coil 49 minutely moves the objective lens 44 on the lens holder 47 in a direction parallel to the data recording face of the optical disc 70, similarly to the focusing coil 48.

The signal processor 7 generates intensity signals of reflected light (hereinafter abbreviated as RF signals) corresponding to the output signals from the photo-sensor 46, and outputs the RF signals to the data slice signal generator 8. The data slice signal generator 8 generates data slice signals by digitalizing the RF signals, and outputs the data slice signals to the main processor 20. The main processor 20 senses pits formed on the optical disc 70 based on the data slice signals.

The signal processor 7 further generates focusing error signals and tracking error signals based on the output signals from the photo-sensor 46, and outputs the focusing error signals and the tracking error signals to the servo controller 9. Each focusing error signal corresponds to a quantity of displacement of the concentration point of the light beam focused by the objective lens 44 from the data recording face of the optical disc 70. Each tracking error signal corresponds to a quantity of displacement of the concentration point of the light beam from a data recording track on the optical disc 70. The servo controller 9 controls the current supply to the focusing coil 48 and the tracking coil 49 for moving the objective lens 44 on the lens holder 47 based on the focusing error signals and the tracking error signals. Thus, the concentration point of the light beam can be placed on the data recording track and on the data recording face of the optical disc 70.

External apparatus such as a monitor display apparatus, a speaker system or a TV receiver (not shown) is connected to the AV signal input/output device 10, so that not only the data reproduced from the optical disc 70 can be outputted as video images and/or sounds, but also the video signals and/or audio signals from the external apparatus can be inputted to the optical disc apparatus 1.

The remote controller 11 has a plurality of operation keys which are operated by a user for selecting a function among several operations of the optical disc apparatus 1. The remote controller 11 transmits infrared ray signals corresponding to the selection by the user. The signal receiver 12 receives the infrared ray signals from the remote controller 11, and outputs operation signals corresponding to the infrared ray signals to the main processor 20. The display device 13 is provided on a front panel of a housing of the optical disc apparatus 1, and displays the contents of the operations selected by the user through the remote controller 11, an operative condition of the optical disc apparatus 1, and so on.

Reproducing operation of the data from the optical disc 70 is described. For reproducing the data from the optical disc 70, a light beam is emitted to the data recording face of the optical disc 70 from the laser diode 41 of the optical pickup 4 and a reflected light reflected on the data recording face is received by the photo-sensor 46, while the optical disc 70 is rotated by the spindle motor 3. Subsequently, the servo controller 9 controls the current supply to the focusing coil 48 for moving the objective lens 44 in the direction perpendicular to the data recording face of the optical disc 70 corresponding to the focusing error signal from the signal processor 7, so that the concentration point of the light beam is just placed on the data recording face of the optical disc 70. Subsequently, the servo controller 9 controls the current supply to the tracking coil 49 for moving the objective lens 44 in the direction parallel to the data recording face of the optical disc 70 corresponding to the tracking error signal from the signal processor 7, so that the concentration point of the light beam is just placed (precisely tracked) on the data recording track on the optical disc 70.

After focusing and tracking the light beam on the data recording track on the optical disc 70, the servo controller 9 executes focusing servo control and tracking servo control by controlling the current supplies to the focusing coil 48 and the tracking coil 49 respectively corresponding to the focusing error signal and the tracking error signal so as to maintain the condition that the light beam is just focused on the data recording track on the optical disc 70.

Under such the condition, the data slice signal generator 8 generates the data slice signals by digitalizing the RF signals outputted from the signal processor 7. The main processor 20 senses the pits formed on the optical disc 70 based on the data slice signals so as to read out the data, and reproduces the data as the audio signals and/or the visual signals. The audio signals and/or the visual signals are outputted to the external apparatus through the A/V signal input/output device 10. The reproduction of the data from the optical disc 70 is executed by this manner.

Recording operation of the data on the optical disc 70 is described. For recording the data on the optical disc 70, the servo controller 9 executes the focusing servo control and the tracking servo control, firstly. Subsequently, the main processor 20 encodes the audio signals and/or the video signals inputted through the AV signal input/output device 10. The laser driver 6 controls the laser diode 41 for emitting light beams pulsatively corresponding to the encoded data by the main processor 20. Thus, the pits corresponding to the encoded data are formed on the data recording track on the optical disc 70, so that the data of video images and/or sounds are recorded on the optical disc 70. Forming of the pits on the optical disc can be realized by increasing the power of the laser light beams emitted from the laser diode 41 than the power of the laser light beam when the data recorded on the optical disc 70 are reproduced.

When the remote controller 11 is operated, the optical disc apparatus 1 reproduces the data from the optical disc 70 or records the data on the optical disc 70 under the control of the main processor 20. When the optical disc 70 is loaded, the main processor 20 executes the initial reading operation for reading out the information data recorded in the innermost data recording area on the optical disc 70. Subsequently, the main processor 20 judges the kind of the optical disc 70 and the contents of the recorded data based on the information data read out from the innermost data recording area in the initial reading operation. After that, the main processor 20 controls the reading or recording the data on the optical disc 70.

Figure 2:
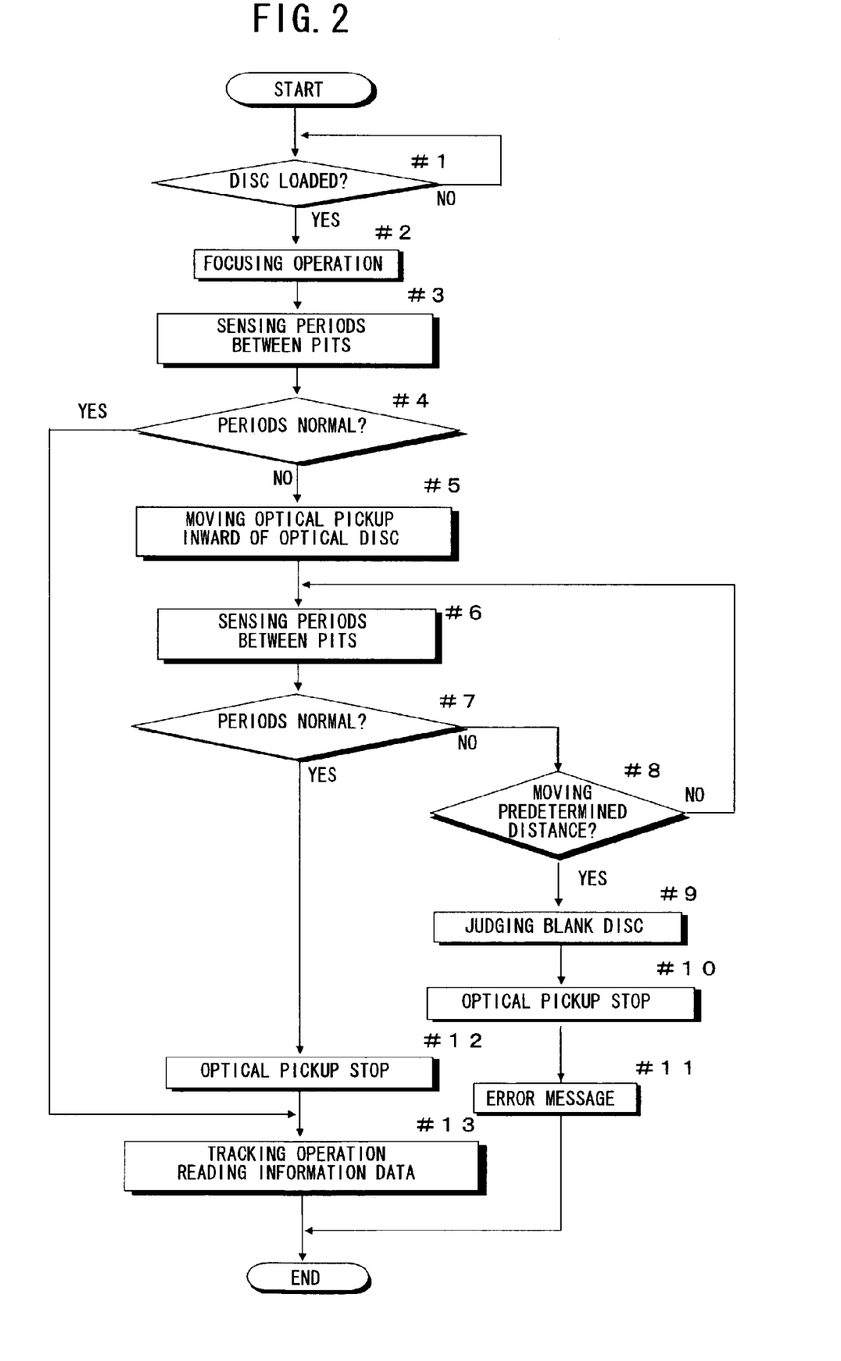
FIG. 2 is a flowchart showing an initial reading operation of the optical disc apparatus in accordance with the embodiment when an optical disc is loaded.

The initial reading operation of the optical disc apparatus 1 when the optical disc 70 is loaded is described with reference to the flowchart illustrated in FIG. 2.

Figure 3:
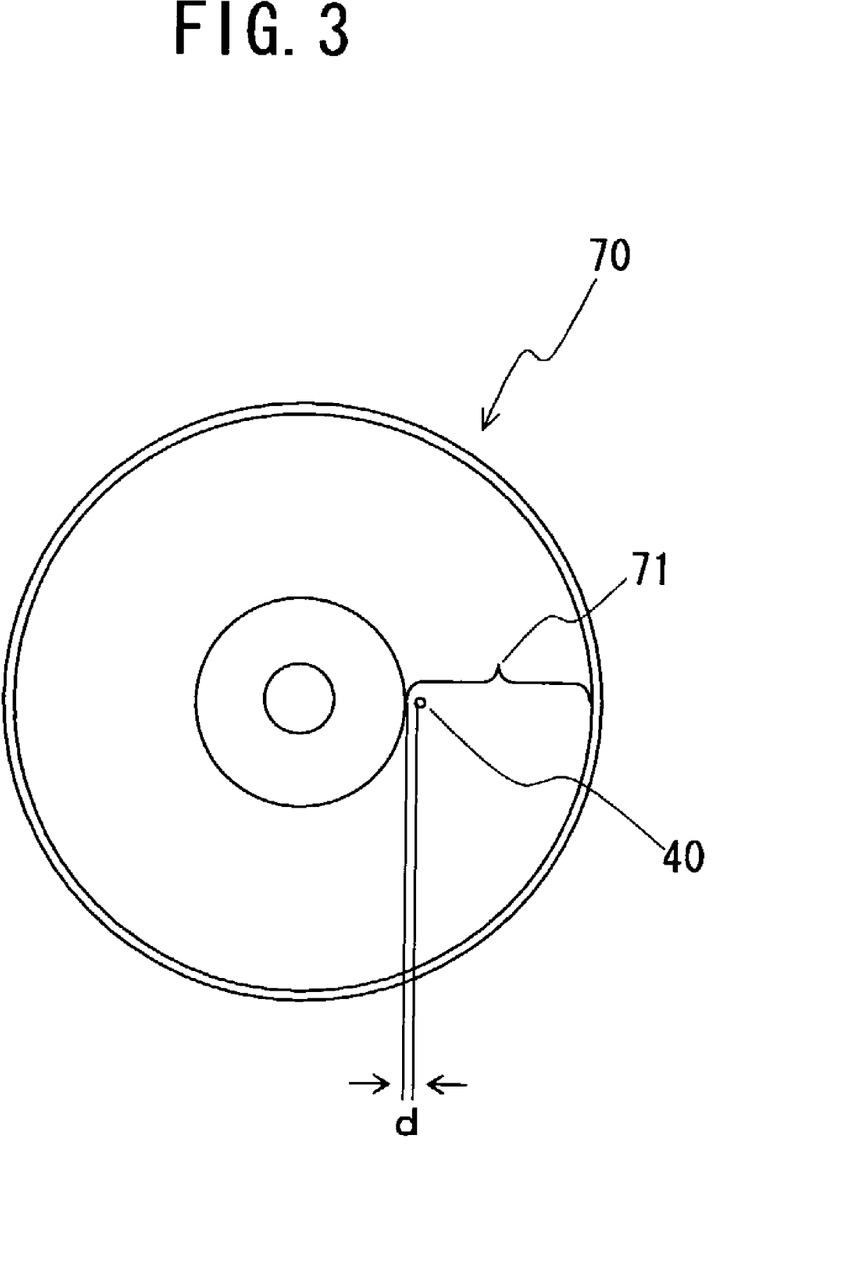
FIG. 3 is a front view of an optical disc showing an example of an initial reading position of an optical pickup at which data are read out firstly from the optical disc in the initial reading operation.

The main processor 20 judges whether the optical disc 70 is loaded on the tray or not corresponding to the sensing signal from the disc sensor 2 (#1). When the main processor 20 judges that the optical disc 70 is loaded (YES in step #1), the main processor 20 drives the spindle motor 3 for rotating the optical disc 70 and drives the driving mechanism 5 for moving the optical pickup 4 in the radial direction of the optical disc 70 to the initial reading position. Subsequently, the main processor 20 controls the servo controller 9 so as to move the objective lens 44 on the lens holder 47 for focusing the light beam emitted from the laser diode 41 on the data recording face of the optical disc 70 (#2). Hereupon, the initial reading position of the optical pickup 4 is designated by numeral 40 in FIG. 3, which is outwardly distant a distance "d" from the innermost edge of a data recording area 71 on the optical disc 70. The data recording tracks (not shown) are concentrically or spirally formed in the data recording area 71. A data recording track facing the initial reading position of the optical pickup 4 is the track to which the data reading is tried firstly in the initial reading operation.

Figure 4A:
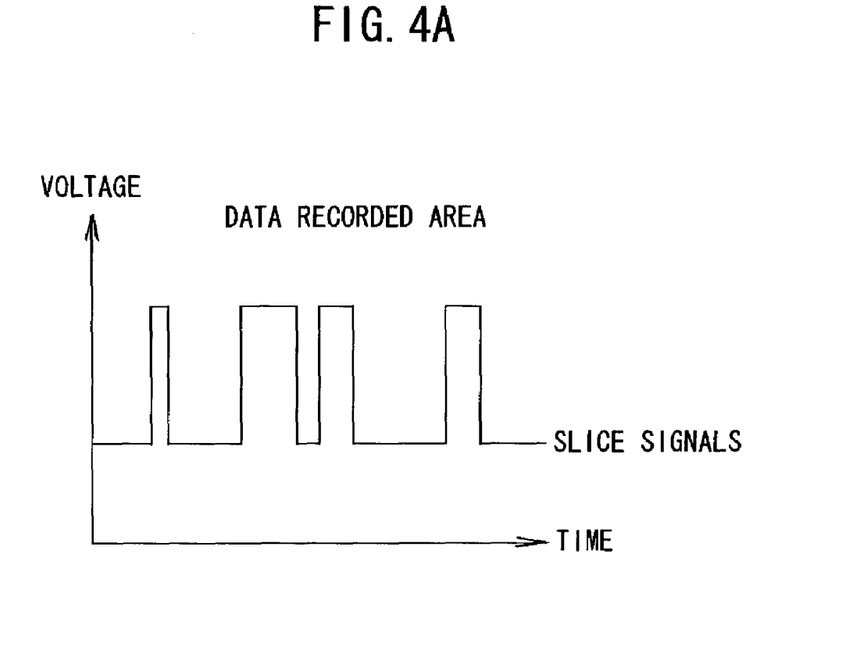
FIG. 4A is a graph showing an example of waveform of a data slice signal used in the optical disc apparatus in accordance with the embodiment when a light beam emitted from an optical pickup is focused on a data recording track on which data are recorded.
Figure 4B:
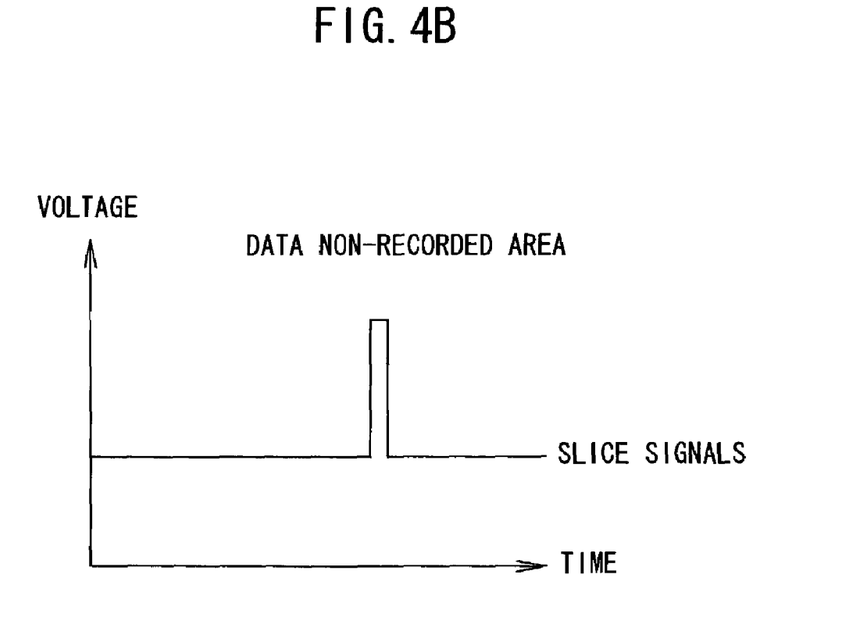
FIG. 4B is a graph showing an example of waveform of a data slice signal used in the optical disc apparatus in accordance with the embodiment when the light beam is focused on a data recording track on which no data is recorded.

Subsequently, the main processor 20 senses the periods between adjoining two pits formed on the optical disc 70 based on the data slice signals outputted from the data slice signal generator 8 under the condition that the light beam emitted from the laser diode 41 of the optical pickup 4 is focused on the data recording face of the optical disc 70 (#3). FIGS. 4A and 4B show the data slice signals outputted from the data slice signal generator 8. As mentioned above, the data slice signals are formed by digitalizing the RF signals. When the pits are formed on the data recording track on which the light beam is focused, a lot of pulsating signals are outputted corresponding to the existence of the pits, as shown in FIG. 4A. Alternatively, when no pit is formed on the data recording track, that is, no data is recorded, the pulsating signals are rarely outputted, as shown in FIG. 4B. The main processor 20 senses the periods of the pits based on such the data slice signals.

When the periods between the pits are sensed, the main processor 20 compares the periods between the pits with the standard value previously memorized in the internal memory of the main processor 20, and judges whether the periods between the pits are normal or not (#4). When the data are recorded, a lot of pits are formed on the data recording track, so that the periods between the pits become shorter. Alternatively, when no data is recorded, the pits are rarely formed on the data recording track, so that the periods between the pits become much longer. When the periods between the pits are equal to or shorter than the standard value, the main processor 20 judges the periods of the pits are normal. Alternatively, when the periods between the pits are longer than the standard value, the main processor 20 judges the periods between the pits are abnormal.

When the periods between the pits are normal (YES in step #4), the main processor 20 judges the information data are recorded on the present data recording track (initial reading track), so that the main processor 20 controls the servo controller 9 for precisely tracking the light beam emitted from the optical pickup 4 on the present data recording track, and reads the information data based on the data slice signals outputted from the data slice signal generator 8 (#13). After reading the information data, the main processor 20 completes the initial reading operation.

Alternatively, when the periods between the pits are abnormal (NO in step #4), the main processor 20 judges no information data is recorded on the present data recording track (initial reading track), so that the main processor 20 controls the driving mechanism 5 for moving the optical pickup 4 inward the optical disc 70 while the light beam is focused on the optical disc 70 (#5). The main processor 20 senses the periods between the pits in real-time based on the data slice signals outputted from the data slice signal generator 8 while the optical pickup 4 is moved (#6). The main processor 20 further judges whether the periods between the pits become normal or not (#7).

When the periods between the pits become normal (YES in step #7), the main processor 20 judges the information data are recorded on the present data recording track, so that the main processor 20 controls the driving mechanism 5 to stop the movement of the optical pickup 4 after passing a predetermined time (#12). Subsequently, the main processor 20 controls the servo controller 9 for precisely tracking the light beam on the present data recording track, and reads the information data based on the data slice signals outputted from the data slice signal generator 8 (#13). After reading the information, the main processor 20 completes the initial reading operation. The reason why the movement of the optical pickup 4 is stopped after passing the predetermined time from the time when the periods between the pits became normal is to prevent that the focused light beam on the optical disc 70 moves to a track on which no information data is recorded again due to the swing or vibration in the tracking operation.

When the periods between the pits are abnormal (NO in step #7), the main processor 20 judges whether the optical pickup 4 is moved by a predetermined distance inwardly in the radial direction of the optical disc 70 or not (#8). When the optical pickup 4 is moved the predetermined distance without becoming the period between the pits normal (YES in step #8), the main processor 20 judges that the optical disc 70 is a blank disc on which no information data is recorded in the innermost data recording area (#9). The main processor 20 controls the driving motor 5 to stop the movement of the optical pickup 4 (#10), and displays an error or alarm message on the display 13 (#11). After stopping the movement of the optical pickup 4, the main processor 20 completes the initial reading operation. It is possible to display a message for showing the blank disc on the display 13 instead of displaying the error message.

In the above-mentioned optical disc apparatus 1, when the information data are recorded only on the data recording tracks inward from the initial reading track from which the data are read out firstly in the initial reading operation, the light beam is not tracked on the data recording track on which no information data is recorded but tracked on only the data recording track on which the data are recorded. When no information data is recorded anywhere on the optical disc 70, the optical disc 70 is judged as the blank disc without tracking the light beam on the data recording track.

The present invention is not restricted the above-mentioned embodiment and can be modified in several manners. It is possible to execute the initial reading operation for reading the information recorded in the innermost data recording area at any time when the power switch of the optical disc apparatus 1 is turned on while the optical disc 70 is loaded, when the user operates the remote controller 11 for reproducing the data from the optical disc 70, or the like, further to the timing when the optical disc 70 is loaded.

This application is based on Japanese patent application 2002-62823 filed in Japan dated Mar. 8, 2002, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. An optical disc apparatus comprising:
   an optical pickup for emitting a light beam to the optical disc, receiving a reflected light from a data recording face of the optical disc, converting variation of intensity of the reflected light to electric signals and outputting the electric signals;
   a driving mechanism for moving the optical pickup in a radial direction of the optical disc;
   a signal processor for generating intensity signals of the reflected light, focusing error signals and tracking error signals corresponding to the signals outputted from the optical pickup;
   a data slice signal generator for generating data slice signals generated by digitalizing the intensity signals of the reflected light outputted from the signal processor;
   a focusing servo controller for focusing the light beam emitted from the optical pickup on the data recording face of the optical disc corresponding to the focusing error signals outputted from the signal processor;
   a tracking servo controller for tracking the light beam on a data recording track on the optical disc corresponding to the tracking error signals outputted from the signal processor; and
   a main processor for controlling an initial reading operation so as to read out information data recorded in the innermost data recording area on the optical disc; wherein
   in the initial reading operation,
   the main processor controls the driving mechanism so as to place the optical pickup at an initial reading position outwardly distant a predetermined distance from the innermost edge of the innermost data recording area on the optical disc, at the start;
   the main processor senses periods between adjoining two pits formed on the optical disc based on the data slice signals outputted from the data slice signal processor while the light beam emitted from the optical pickup is focused on the data recording face of the optical disc by the focusing servo controller at the initial reading position, and compares the periods between the pits with a standard value memorized in a memory;
   when the periods between the pits are equal to or smaller than the standard value, the main processor judges that the information data are recorded on a data recording track facing the initial reading position of the optical pickup, controls the tracking servo controller so as to track the light beam precisely on the data recording track facing the initial reading position, and reproduces the information data based on the data slice signals obtained from the pits sensed on the data recording track;
   alternatively, when the periods between the pits are larger than the standard value, the main processor judges that no information data is recorded on a data recording track facing the initial reading position of the optical pickup, controls the driving mechanism so as to move the optical pickup inwardly from the initial reading position, senses periods between the pits formed on the optical disc based on data slice signals outputted from the data slice signal processor while the optical pickup is moved and the light beam is focused on the data recording face of the optical disc, and compares the periods between the pits with the standard value memorized in a memory;
   when the periods of the pits become equal to or smaller than the standard value, the main processor judges that the information data are recorded on the data recording track facing the optical pickup, controls the tracking servo controller so as to track the light beam precisely on the data recording track, and reproduces the information data based on the data slice signals obtained from the pits sensed on the data recording track; and
   when the periods between the pits has not become equal to or smaller than the standard value after moving the optical pickup by a predetermined distance inwardly from the initial reading position, the main processor judges the optical disc is a blank disc on which no information data is recorded, and outputs an alarm for showing the optical disc is the blank disc.

2. The optical disc apparatus in accordance with claim 1, further comprising a display device and wherein
   the alarm or a message for showing the optical disc is the blank disc is displayed on the display device when the main processor judges the optical disc is the blank disc.

3. The optical disc apparatus in accordance with claim 1, wherein
   when the periods between the pits sensed in the data recording area inward from the initial reading position of the optical pickup become equal to or smaller than the standard value, the main processor controls the driving mechanism to stop the movement of the optical pickup after passing a predetermined time, and controls the tracking controller for precisely tracking the light beam on the data recording track so as to read out the information data from the optical disc.

4. The optical disc apparatus in accordance with claim 1, wherein
   the initial operation is executed when the optical disc is loaded on the optical disc apparatus.

5. The optical disc apparatus in accordance with claim 1, wherein
   the initial operation is executed when a power switch of the optical disc apparatus is turned on or when reproduction of data from the optical disc is selected under a condition that the optical disc has been loaded on the optical disc apparatus.

6. An optical disc apparatus comprising:
   an optical pickup moving in a radial direction of the optical disc, emitting a light beam to the optical disc, receiving a reflected light from a data recording face of the optical disc, converting variation of intensity of the reflected light to electric signals and outputting the electric signals;

a signal processor for generating intensity signals of the reflected light, focusing error signals and tracking error signals corresponding to the signals outputted from the optical pickup;

a focusing servo controller for focusing the light beam emitted from the optical pickup on the data recording face of the optical disc corresponding to the focusing error signals outputted from the signal processor;

a tracking servo controller for tracking the light beam on a data recording track on the optical disc corresponding to the tracking error signals outputted from the signal processor; and a main processor for controlling an initial reading operation so as to read out information data recorded in the innermost data recording area on the optical disc; wherein in the initial reading operation, the main processor senses periods between adjoining two pits formed on the optical disc from the electric signals outputted from the optical pickup, and judges whether the periods between the pits are normal or not while the light beam emitted from the optical pickup is focused on the data recording face of the optical disc by the focusing servo controller;

when the periods between the pits are normal, the main processor controls the tracking servo controller so as to track the light beam precisely on the present data recording track, and reproduces the information data from the electric signals outputted from the optical pickup;

alternatively, when the periods between the pits are abnormal, the main processor senses the periods between the pits and judges whether the periods between the pits become normal or not while the optical pickup is moved inwardly and the light beam is focused on the data recording face of the optical disc;

when the periods of the pits become normal, the main processor controls the tracking servo controller so as to track the light beam precisely on the present data recording track, and reproduces the information data from the electric signals outputted from the optical pickup; and when the periods between the pits has not become equal to or smaller than a standard value after moving the optical pickup by a predetermined distance inwardly from an initial reading position, the main processor includes the optical disc is a blank disc on which no information data is recorded, and outputs an alarm for showing the optical disc is the blank disc.

7. A method for reading out information data from an optical disc in an optical disc apparatus comprising the steps of:

placing an optical pickup at an initial reading position outwardly distant a predetermined distance from the innermost edge of an innermost data recording area on the optical disc;

sensing periods between adjoining two pits formed on the optical disc based on electric signals outputted from the optical disc while a light beam emitted from the optical pickup is focused on a data recording face of the optical disc, and comparing the periods between the pits with a standard value;

when the periods between the pits are equal to or smaller than the standard value, tracking the light beam precisely on a data recording track facing the initial reading position, and reproducing the information data based on the electric signals obtained from the pits sensed on the data recording track;

alternatively, when the periods between the pits are larger than the standard value, moving the optical pickup inwardly from the initial reading position, and sensing periods between the pits formed on the optical disc based on the electric signals outputted from the optical pickup while the optical pickup is moved and the light beam is focused on the data recording face of the optical disc, and comparing the periods between the pits with the standard value;

when the periods of the pits become equal to or smaller than the standard value, tracking the light beam precisely on the data recording track, and reproducing the information data based on the electric signals obtained from the pits sensed on the data recording track; and when the periods between the pits has not become equal to or smaller than the standard value after moving the optical pickup by a predetermined distance inwardly from the initial reading position, the main processor judges the optical disc is a blank disc on which no information data is recorded, and outputs an alarm for showing the optical disc is the blank disc.

* * * * *